United States Patent [19]

Deschler et al.

[11] Patent Number: 5,083,535
[45] Date of Patent: Jan. 28, 1992

[54] DEVICE FOR COMPENSATING SECONDARY MOMENTS OF INERTIA IN FIVE-CYLINDER IN-LINE ENGINE

[75] Inventors: Gerhard Deschler, Nuremburg; Hans Gebhardt, Langenzenn, both of Fed. Rep. of Germany

[73] Assignee: MAN Nutzfahrzeuge Aktiengesellschaft, Munich, Fed. Rep. of Germany

[21] Appl. No.: 715,821

[22] Filed: Jun. 14, 1991

[30] Foreign Application Priority Data

Jun. 16, 1990 [DE] Fed. Rep. of Germany ....... 4019304

[51] Int. Cl.⁵ ............................................. F02B 75/06
[52] U.S. Cl. ................................... 123/192.2; 74/603
[58] Field of Search ............... 123/192 B; 74/603, 604

[56] References Cited

U.S. PATENT DOCUMENTS 4,677,948 7/1987 Candea ........................... 123/192 B Primary Examiner—Noah P. Kamen
Attorney, Agent, or Firm—Robert W. Becker & Associates

[57] ABSTRACT

A device for compensating secondary moments of inertia in five-cylinder in-line combustion engines is provided. With in-line combustion engines having an uneven number of cylinders secondary moments of inertia occur and must be eliminated. This problem is solved by providing compensating masses of the Lanchester type separate from one another and supported in respective bearing housings that are connected to the crank case. The individual compensating masses are driven via the third and the eight crank web of the crank shaft since these are free of compensating masses of the first order. The first and second compensating masses, viewed in the direction of the star-like crank throw arrangement, are displaced in the same direction by the same amount so that the secondary forces due to inertia do not generate an additional torque about the crank shaft. The device may be advantageously incorporated into existing combustion engines.

3 Claims, 4 Drawing Sheets

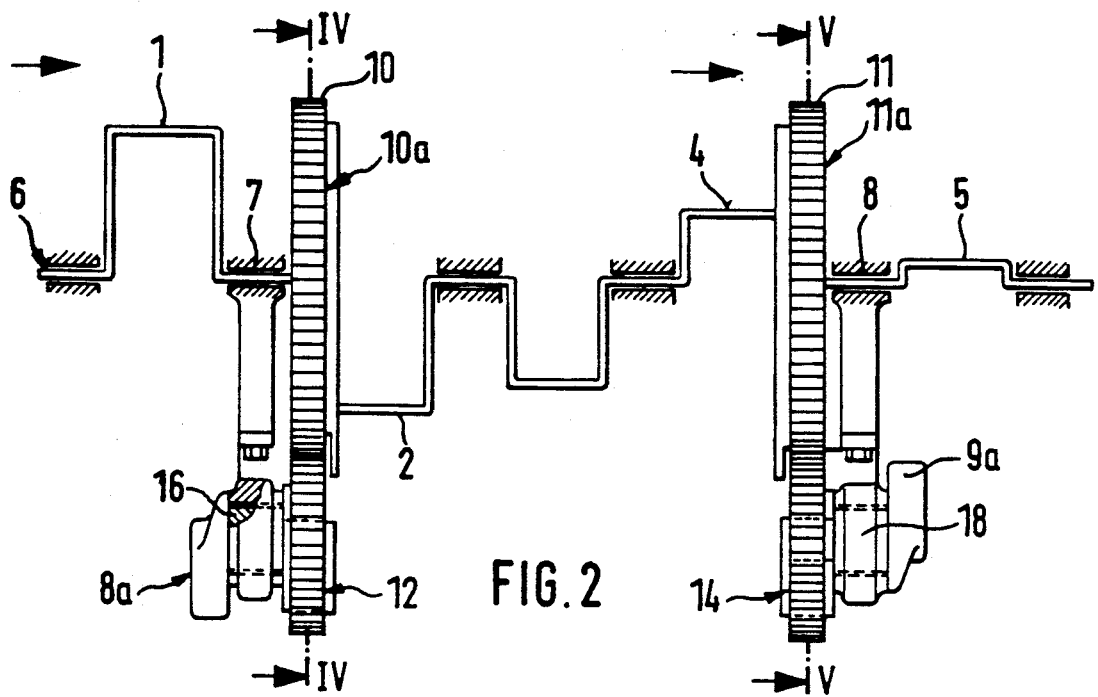
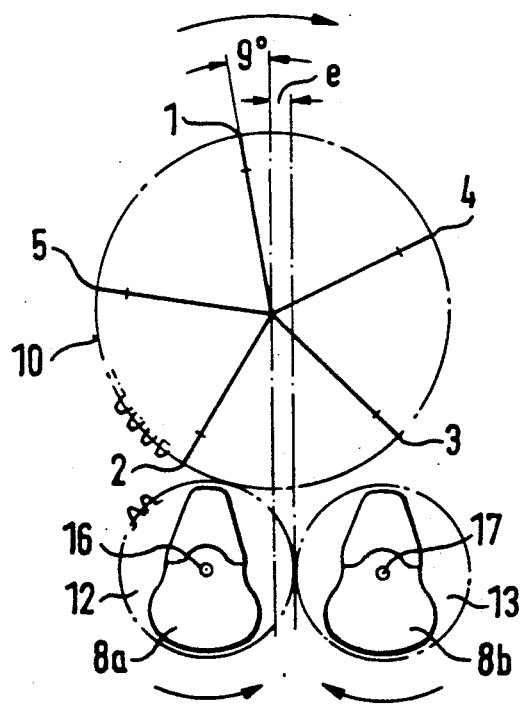
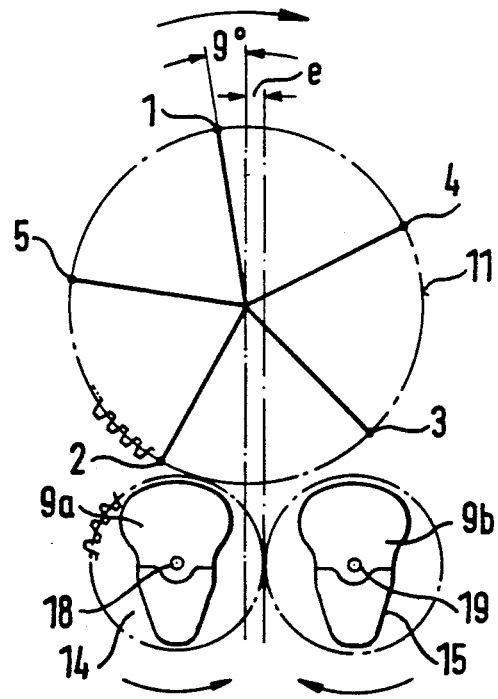
FIG. 2
FIG. 4
FIG. 5

DEVICE FOR COMPENSATING SECONDARY MOMENTS OF INERTIA IN FIVE-CYLINDER IN-LINE ENGINE

BACKGROUND OF THE INVENTION

The present invention relates to a device for compensating secondary moments of inertia in 5-cylinder in-line combustion engines with a uniform firing order 1-2-4-5-3. The device comprises first and second compensating mass means that are comprised of two compensating masses respectively and are provided in an area of respective ends of a crank shaft, with the first compensating mass means and the second compensating mass means having compensating shafts that are disposed parallel to the crank shaft. The first compensating mass means, viewed from a first crank throw of the crank shaft in a direction toward the fly wheel (showing a so-called star-like crank throw arrangement of the crank shaft), is rotated 180° plus an angle in a rotational direction of the engine relative to the first crank throw and the second compensating mass means is arranged at an end of the crank shaft opposite the first compensating mass means and is rotated 180° relative to the first compensating mass means. The two compensating masses of the respective first and second compensating mass means are in a torque connection with the crank shaft such that the two compensating masses respectively, rotate oppositely directed relative to one another with a double rotation speed of the crank shaft.

The publication by Professor Dr. Ing. Hussmann "Umdnick zur Vorlesung Maschinendynamik" provides the teaching for compensating free moments of inertia of a first, second and higher order. According to this publication the free moments of inertia disappear in engines having an even number of cylinders and a uniform firing order. On the other hand, in engines with an uneven number of cylinders and a uniform firing order a compensation for moments of inertia is necessary. The elimination of free moments of inertia of a second order may be achieved by providing two compensating shafts that are arranged in parallel to the crank shaft, whereby the compensating shafts rotate oppositely directed relative to one another with a double revolution speed of the crank shaft. The compensating shafts are provided with compensating masses at their free ends which are rotated about 180° relative to one another. In order to maintain the phase relationship of the oppositely rotating compensating shafts relative to the crank shaft a torque connection between the two compensating shafts and the crank shaft is required. Viewed in the direction of the star-like arrangement of the crank throws of the crank shaft the compensating masses of one side which are arranged in parallel in their initial position must be rotated 180°+γ relative to a first crank throw of the crank shaft. The first crank throw in this respect is the one that is disposed at the end of the crank shaft opposite the fly wheel. The compensating shafts must be arranged in parallel to the crank shaft. It is known from U.S. Pat. No. 3,667,317 to provide oppositely rotating compensating masses for compensating secondary forces of inertia which are driven by a crank web via toothed wheels. The compensating masses in the given example of a four-cylinder engine is achieved by a crank web that is adjacent to a symmetry plane of the represented four-cylinder engine. With such a compensating device only forces due to inertia may be eliminated. Moments of inertia about the transverse axis may not be compensated in this manner.

It is known from DE-OS 36 15 695 to arrange the two compensating shafts, which are rotating oppositely to one another with the double revolution speed of the crank shaft, in an oil pan. The compensating shafts are disposed parallel to the crank shaft and are driven by the crank web via a toothed rim and intermeshing toothed wheels in order to maintain the revolution speed and phase relationship relative to the crank shaft. The toothed rim initially drives via a toothed wheel a first compensation shaft and then via a toothed wheel a second compensation shaft. The gear ratio of the toothed rim to the toothed wheels of the compensation shafts is 1:2. Since a four-cylinder engine is described in this reference no moments of inertia but only forces due to inertia will occur. In order to completely eliminate the secondary forces of inertia the compensating masses are provided only on one side of the compensating shafts in a symmetry plane A disadvantage of such a device must be seen in that the bearing within an oil pan is problematic with respect to the distance between pinion and toothed wheel which must be exactly adjusted. The sealing between the crank case and the oil pan flange is usually achieved via elastic sealings which, however, inadvertently result in a changing axis distances. A support in this manner can only represent a last resort when the support of the compensating shafts together with the compensating masses within other components of the engines is not possible.

The five-cylinder in-line combustion engine has free moments of inertia of a first and second order due to the crank shaft arrangement which is not symmetrical in the longitudinal direction. The load caused by these moments of inertia which is outwardly effective and increases with the square of the number of revolutions must be compensated by the engine suspension. Disturbing effects onto the environment are usually prevented by providing intermediate elastic components between the engine and the foundation. Due to respective adjustments it is possible to eliminate almost entirely the excitations due the inertia masses of the engine. This effect commonly known as insulation, i.e., reduction of the excitation forces on the foundation, will only result at over-critical adjustments when $n_{err}/n_e > \sqrt{2}$ and is the more effective the more the operation frequency $n_{err}$ deviates from the eigen frequency $n_e$ of the oscillating system, that is, the greater the distance between the operation point and the resonance location.

Concerning the foundation load the negative characteristics of the five-cylinder engine may be overcome by elastic support and optionally adjusted damping. Since the excitation forces in this case are primarily compensated by the engine and the adjacent gear unit and only fractionally by the foundation, high loads occur at the engine and the gear unit which may result in deformations, especially at the connection between the engine and the gear unit which is the soft spot of the oscillating system. Since the system due to its high eigen frequency in comparison to an elastic support is usually operated in an under critical range a certain safety distance to the resonance location must be maintained in order to prevent critical loads. Due to the secondary moments of inertia of a secondary order present in five-cylinder engines the usable range is rather limited and an increase in performance accompanied by heavier gear units results in a decrease of the eigen frequency which cause higher characteristic form amplitudes.

This results in a greater axial movement in the longitudinal compensation of the drive shaft which, at a high torque output, results in axial forces of a considerable amount and causes, besides uncomfortable axial oscillations, damages to the gear unit support.

It is therefore an object of the present invention to provide a device of the aforementioned kind for compensating secondary moments of inertia whereby the compensating shafts may be arranged within the crank case, even for existing combustion engines, without alterations to the crank case.

BRIEF DESCRIPTION OF THE DRAWINGS

This object, and other objects and advantages of the present invention, will appear more clearly from the following specification in conjunction with the accompanying drawings, in which:

FIG. 2 shows a side view of the crank shaft illustrating the drive of the compensating shafts and the compensating masses connected thereto;

FIG. 4 is a front view of the star-like arrangement of the crank throws of a crank shaft with 5 symmetrical crank throws and the first two compensating masses;

FIG. 5 shows a front view of the star-like arrangement of the crank throws according to FIG. 4 in a view showing the second two compensating masses;

SUMMARY OF THE INVENTION

Figure 1:
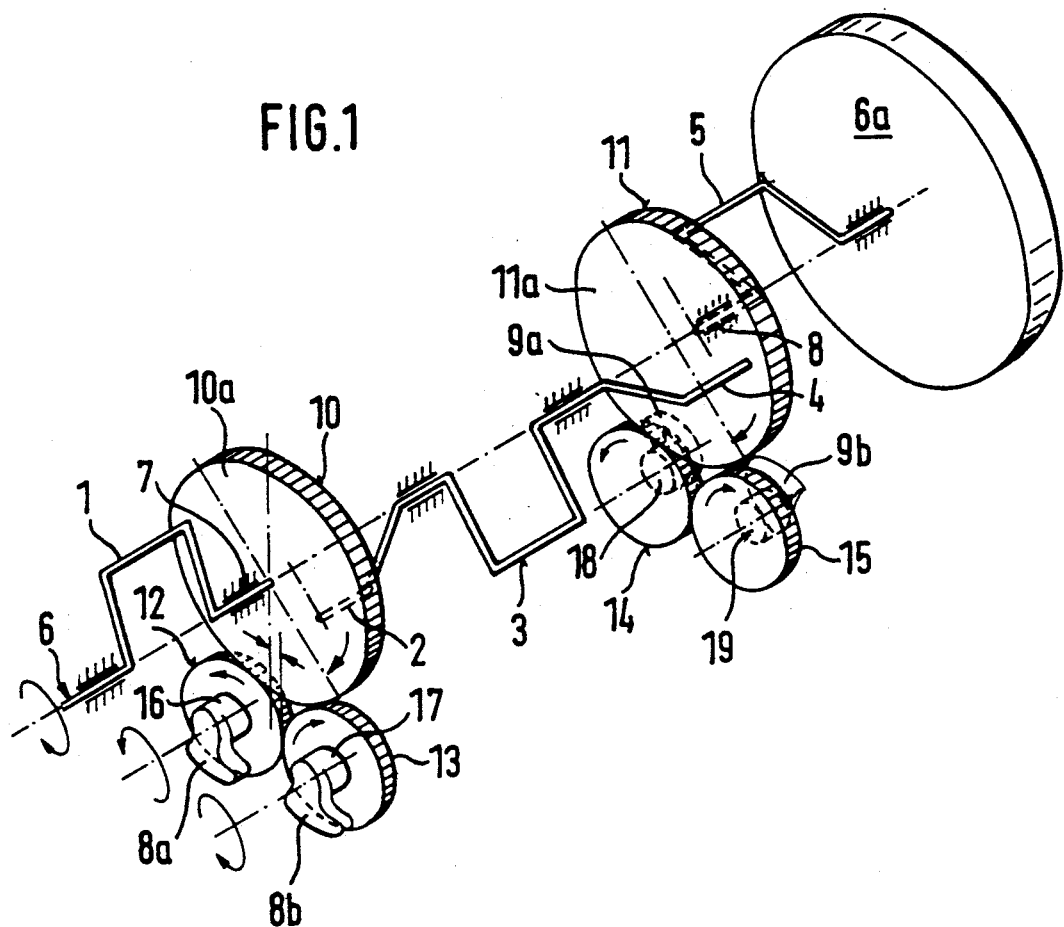
FIG. 1 is a perspective view of the arrangement of the crank shaft and the compensating shafts with attached compensating masses.

The device for compensating secondary moments of inertia of the present invention is primarily characterized by:

The first and the second compensating mass means are driven via a third crank web and an eighth crank web of the crank shaft whereby numbering of the crank webs of the crank shaft commences at the first crank throw;

the first and second compensating mass means are mounted in overhung arrangement via the respective compensating shafts in respective bearing housings that are connected to a crank case;

the first compensating mass means is connected in a torque connection to the crank shaft via a toothed rim that is provided at the third crank web, whereby the toothed rim intermeshes with a first toothed wheel provided at a first one of the compensating shafts, and the first toothed wheel intermeshes with a second toothed wheel provided at a second one of the compensating shafts;

the second compensating mass means is connected in a torque connection to the crank shaft via a toothed rim that is provided at the eight crank web, whereby the toothed rim intermeshes with a third toothed wheel provided at a third one of the compensating shafts, and the third toothed wheel intermeshes with a fourth toothed wheel provided at a fourth one of the compensating shaft;

the first compensating mass means is arranged essentially in a plane below a first bearing means that is adjacent to the third crank web, and the second compensating mass means is arranged essentially below a second bearing means that is adjacent to the eighth crank web; and the first, second, third and fourth compensating shafts are laterally displaced in a same direction by an identical amount relative to a center line of the crank shaft.

Since the compensating shafts are driven by the third and eighth crank web of the crank shaft and since the compensating mass means or compensating masses are arranged within a plane below the adjacent bearing means, the compensating masses may be accommodated in a crank case of a given five-cylinder in-line combustion engine without substantial changes to the crank case since they will not interfere with the compensating masses of a first order that are arranged at the remaining crank webs of the crank shaft. The compensating masses are not disposed, as is common in the art, on a common compensating shaft, but each one of the compensating shafts is supported directly via a bearing housing within the crank case directly below the bearing means of the crank shaft so that the bearing housing is connected fixedly to the crank case. Thus, meeting the requirements for the axis distance of the crank shaft to the rotating axes of the compensating masses is easily achieved. A continuous compensating shaft would interfere with the crank throws and the compensating masses of a first order of the rotating crank shaft so that the direct accommodation within the crank case of a given combustion engine is precluded.

In a preferred embodiment the angle of rotating the two compensating masses of the first compensating mass means is 9° and corresponds to a position of the first crank throw before the top dead center position thereof in an initial stage.

By properly selecting the phase relationship between the crank shaft and the compensating masses the secondary moments of inertia may be eliminated.

In a further preferred embodiment the bearing housings for bearing the compensating shafts are respectively disposed in a plane below the bearing means and are attached to the sides of the crank case by screw means whereby each one of the compensating masses of the respective first and second compensating mass means comprises a first and a second half respectively so that a respective center of gravity of each one of the compensating masses is positioned such that a respective force couple of inertia forces of the first compensating mass means and the second compensating mass means eliminates the secondary moments of inertia; the first half of each one of the compensating masses is an integral part of the respective compensating shaft, and the second half of each one of the compensating masses is an integral part of the respective toothed wheel and is fixedly connected to the respective compensating shaft.

DESCRIPTION OF PREFERRED EMBODIMENTS

The present invention will now be described in detail with the aid of several specific embodiments utilizing FIGS. 1 through 7.

FIG. 1 shows a schematic representation of a crank shaft of a five-cylinder in-line combustion engine having a uniform firing order. The crank shaft 6 is provided with crank throws 1 to 5 that are staggered equidistantly relative to one another. The firing order for the shown star-like crank throw arrangement is 1-2-4-5-3. The numbering of the crank throws 1 to 5 commences at the end of the crank shaft 6 that is opposite the fly wheel 6a. For the compensation of the secondary moments of inertia first and second compensating mass means 8a, 8b and 9a, 9b are provided below the bearing means 7 and 8 between the crank throws 1 and 2 respectively 4 and 5.

The first compensating mass means comprises two compensating masses 8a and 8b and the second compensating mass means comprises two compensating masses 9a and 9b.

The compensating masses are driven via first and second toothed rims 10 and 11 which are connected to a third crank web 10a respectively an eighth crank web 11a of the crank shaft 6. According to the present invention, the first compensating masses 8a, 8b are driven via the first toothed rim 10 which is disposed on the third crank web 10a. The second compensating masses 9a, 9b are driven via the second toothed rim 11 which is disposed at the eighth crank web 11a. These crank webs 10a, 11a are not provided with compensating masses of a first order. The compensating masses 8a, 8b and 9a, 9b are driven by the toothed rims 10, 11 via toothed wheels 12 to 15 which are represented in FIGS.. 3 to 5. The compensating masses 8a, 8b and 9a, 9b are mounted in an overhung arrangement on compensating shafts 16 to 19 and supported in not-represented bearing housings, which are connected to the crank case of the combustion engine (not represented in the drawing).

The arrangement of the compensating masses 8a, 8b and 9a, 9b relative to the crank shaft 6 will be explained with the aid of FIG. 2 which shows the arrangement in a side view. The first toothed rim 10 is disposed on the third crank web 10a between the crank throws 1 and 2. The toothed rim 10 drives via the toothed wheel 12 and the compensating shaft 16 the compensating mass 8a. The compensating mass 8a is positioned below the bearing means 7. The compensating mass 8b is positioned in the same plane and is driven via the toothed wheel 12 and the intermeshing toothed wheel 13 (represented in FIG. 4).

The second compensating masses 9a, 9b are driven via the second toothed rim 11 that is disposed on the eighth crank web 11a between the crank throws 4 and 5. The second toothed rim 11 drives via the toothed wheel 14 and the compensating shaft 18 a compensating mass 9a. The compensating shaft 9a is arranged in a plane below the bearing means 8. The compensating mass 9b is positioned in the same plane and is driven via the toothed wheel 14 and the intermeshing toothed wheel 15 (represented in FIG. 5)

The displacement of the compensating masses 8a, 8b and 9a, 9b about 180° relative to one another results in a moment about the transverse axis of the crank shaft 6.

Figure 3:
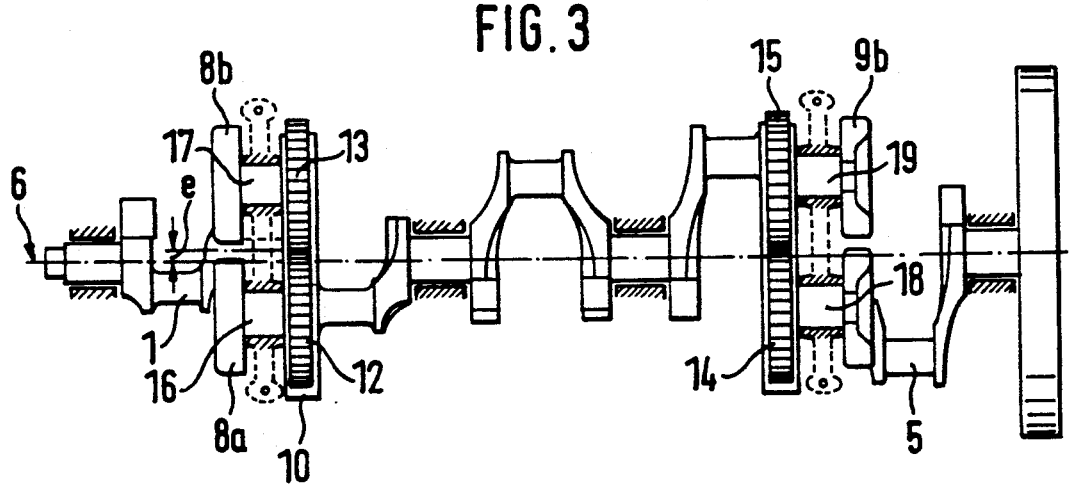
FIG. 3 is a bottom view of the crank shaft with the compensating shafts arranged in parallel.

FIG. 3 shows a bottom view of the crank shaft 6 with the compensating shafts 16 to 19 and the compensating masses 8a, 8b and 9a, 9b. The first toothed rim 10 that is disposed on the third crank web 10a of the crank shaft 6 drives via the toothed wheels 12 and 13 the first compensating masses 8a, 8b which are supported at compensating shafts 16, 17. The compensating shafts 16, 17 of the first compensating masses 8a, 8b are inventively displaced relative to the center line of the crank shaft 6 by an amount e. The compensating shafts 16 to 19 may be displaced to the left or to the right, whereby it is only important that all of the compensating shafts are displaced to the same side.

The compensating shafts 18 and 19 of the second compensating masses 9a and 9b are displaced by the same amount e and to the same side of the center line of the crank shaft 6.

Due to this inventive displacement a torque, due to the forces resulting from the compensating masses 8a, 8b and 9a, 9b, about the center line of the crank shaft 6 is avoided since the forces due to inertia are equal but the torque is eliminated due to the reversed sign of the forces and the equal displacement e.

FIG. 4 shows a view of the star-like crank throw arrangement with the first compensating masses 8a, 8b, viewed from the first crank throw 1. The first crank throw 1 in the position shown in the drawing, is rotated 9° opposite to the direction of rotation of the crank shaft 6 of the combustion engine relative to the top dead center position of this crank throw 1. The remaining crank throws 2 to 5 are arranged relative to one another as described above.

The first compensating masses 8a and 8b are driven via the first toothed rim 10 and the toothed wheels 12 and 13 and the compensating shafts 16 and 17. The toothed rim 10 intermeshes with the toothed wheel 12 and the toothed wheel 12 intermeshes with the toothed wheel 13. The transmission ratio of the toothed rim 10 to the toothed wheels 12 and 13 is selected to 1:2 so that the compensating masses 8a, 8b rotate oppositely with the double revolution speed of the crank shaft 6.

The compensating shafts 16 and 17, in the represented example, are displaced by an amount e to the right and, in the shown position, generate relative to the center line of the crank shaft a torque directed to the right. This torque is compensated by a torque of the compensating masses 9a and 9b as can be seen in FIG. 5.

FIG. 5 shows, viewed from the first crank throw 1, the star-like crank throw arrangement with the second compensating masses 9a and 9b. The second compensating masses 9a, 9b are driven by the second toothed rim 11 which is disposed on the eighth crank web 11a (FIG. 2). The second toothed rim 11 intermeshes with the toothed wheel 14 of the compensating shaft 18 which is fixedly connected to the compensating mass 9a. The toothed wheel 14 drives via the toothed wheel 15 the compensating shaft 19 which is fixedly connected to the second compensating mass 9b. The compensating shafts 18 and 19 are displaced to the right by an amount e as are the compensating shafts 16 and 17. As previously mentioned in the description of FIG. 4, due to this measure a torque about the center line of the crank shaft 6 is avoided. The displacements mentioned in FIGS. 4 and 5 may also be carried out to the left, it is only important that the first and second compensating masses 8a, 8b and 9a, 9b are displaced by the same amount e and into the same direction.

Figure 6:
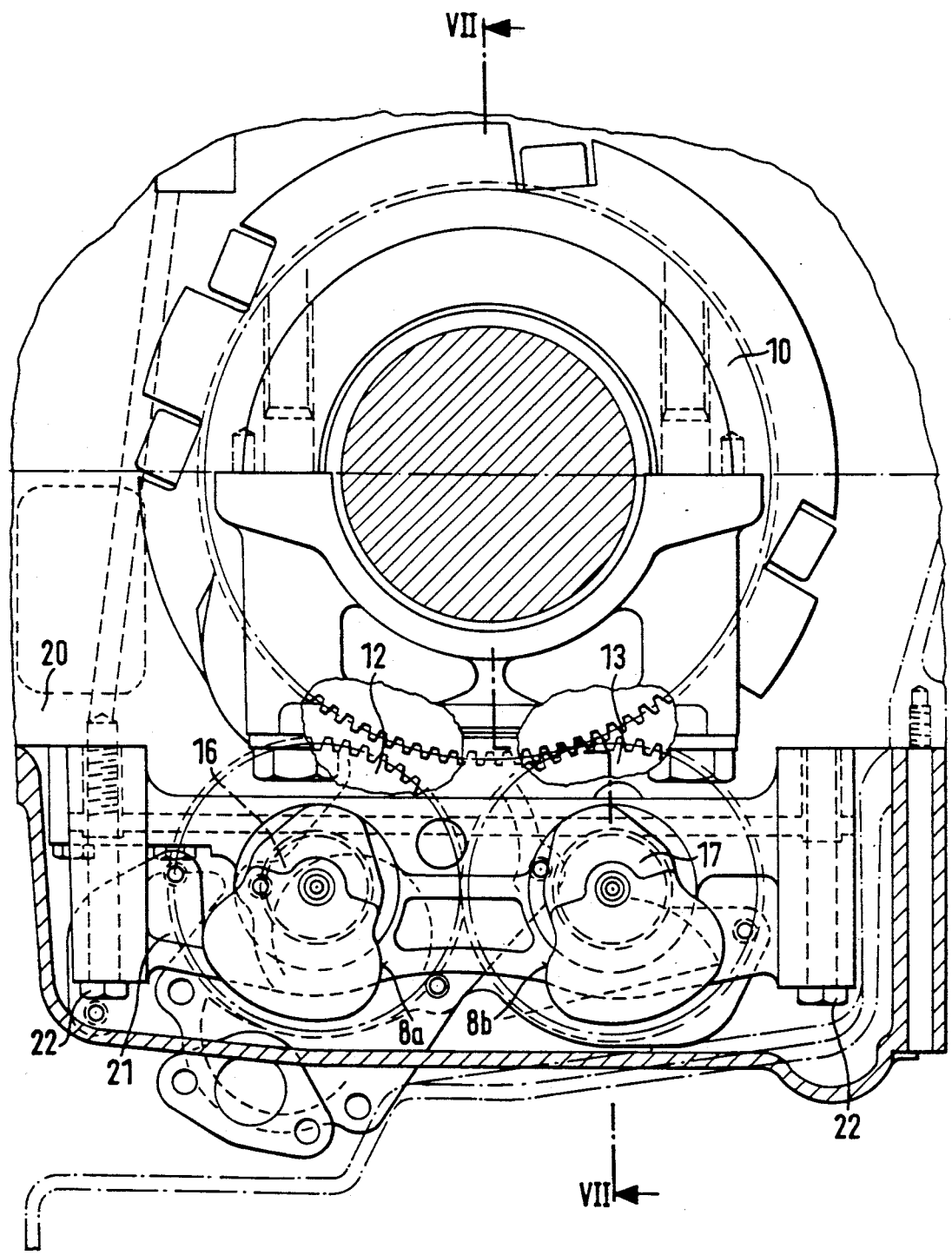
FIG. 6 shows a front view of the support of the compensating shafts at the crank case.

A constructive solution of the bearing arrangement of the compensating shafts and their attachment to the crank case 20 is represented in FIG. 6. As an example for the bearing arrangement the compensating masses 8a, 8b are chosen. The two compensating masses 8a, 8b are guided in the bearing housing 21 which is directly fastened to the crank case 20 by screws 22. The compensating masses are driven via the toothed rim 10 which is arranged, according to FIGS. 1 and 2, on the third crank web 10a and intermeshes with the toothed wheel 12. The toothed wheel 12 drives the compensating mass 8a via the compensating shaft 16. The toothed wheel 12 intermeshes with the toothed wheel 13 and drives the compensating shaft 17 which is arranged parallel to the compensating shaft 16 thus driving the respective compensating mass 8b.

Figure 7:
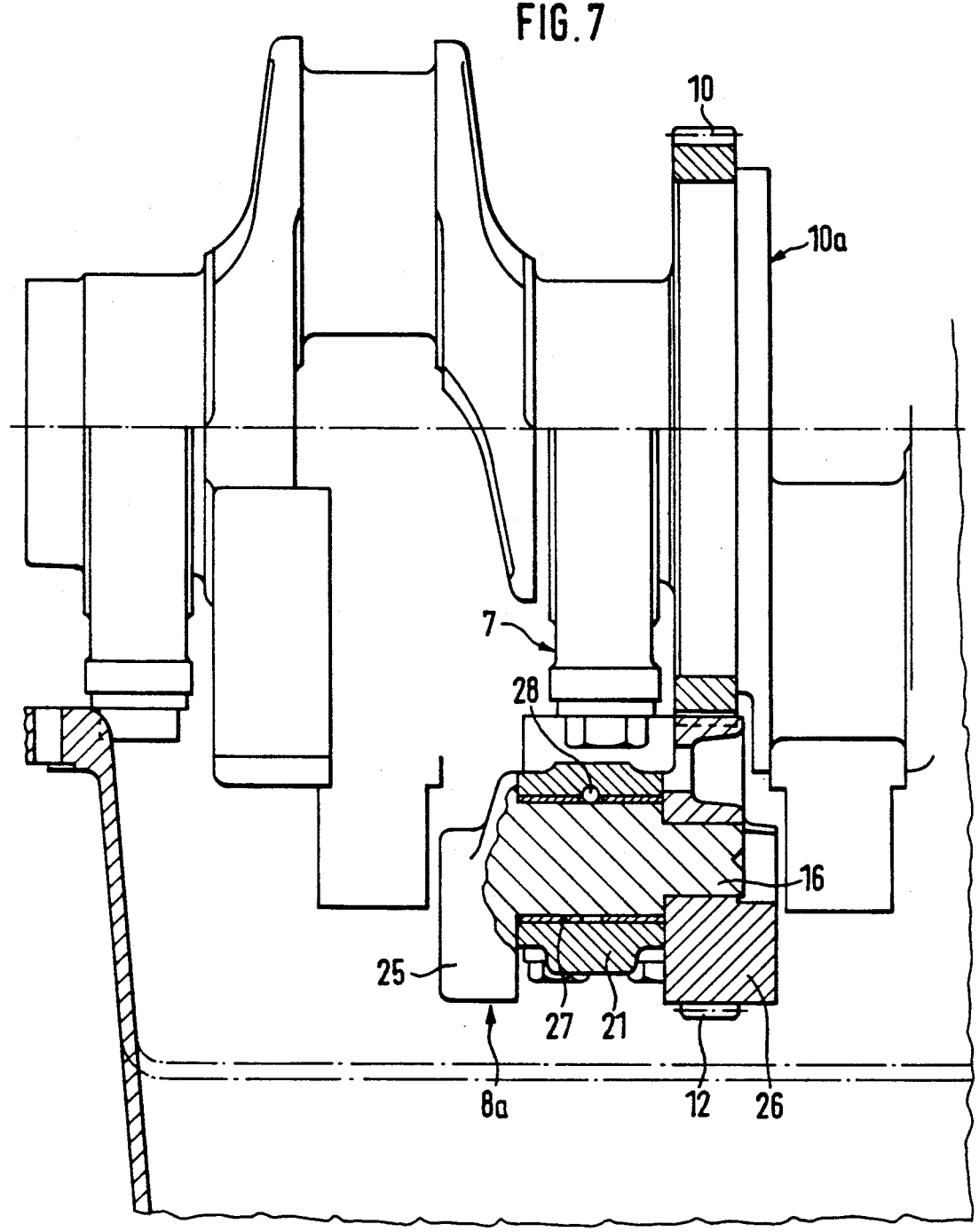
FIG. 7 shows a view along the line VII—VII of FIG. 6 in which the compensating masses and their support is represented.

FIG. 7 shows a view along the line VII—VII of FIG. 6 representing the guiding of the compensating mass 8a within the bearing housing 21. The compensating mass 8a is comprised of a first half 25 which is an integral part of the compensating shaft 16 and a second half 26 which is an integral part of the toothed wheel 12. The second half 26 together with a toothed wheel 12 is placed onto the compensating shaft 16 and fixedly connected, for example, by a slip joint. The toothed wheel 12 is driven via the toothed rim 10 that is slipped onto the third crank web 10a and fixedly connected to it. The mass distribution of the first and second half 25 and 26 is selected such that the resulting center of gravity is positioned away from the symmetry plane of the engine such that the forces due to inertia compensate one half of the secondary moments of inertia while the forces due to inertia of the other side (not represented here) compensate the other half of the secondary moments of inertia. The lubrication of the compensating shaft 16 within the bearing box 27 is provided via a line 28 that is connected to the oil circulation of the engine.

The present invention is, of course, in no way restricted to the specific disclosure of the specification and drawings, but also encompasses any modifications within the scope of the appended claims.

What we claim is:

1. A device for compensating secondary moments of inertia in five-cylinder in-line combustion engines with a uniform firing order 1-2-4-5-3, said device comprising first and second compensating mass means that are comprising two compensating masses respectively and are provided in an area of respective ends of a crank shaft, with said first compensating mass means and said second compensating mass means having compensating shafts that are disposed parallel to said crank shaft, whereby, viewed from a first crank throw of said crank shaft in a direction toward a fly wheel of said crank shaft, said first compensating mass means is displaced 180° plus an angle in a rotational direction of said engine relative to said first crank throw and said second compensating mass means is arranged at an end of said crank shaft opposite said first compensating mass means and is displaced 180° relative to said first compensating mass means with said two compensating masses of said respective first and said second compensating mass means being in a torque connection with said crank shaft such that said two compensating masses respectively, rotate oppositely directed relative to one another with a double rotation speed of said crank shaft, the improvement wherein:

said first and said second compensating mass means are driven via a third crank web and an eighth crank web of said crank shaft, whereby numbering of crank webs of said crank shaft commences at said first crank throw;

said first and second compensating mass means are mounted in overhung arrangement via said respective compensating shaft in respective bearing housings that are connected to a crank case;

said first compensating mass means is connected in a torque connection to said crank shaft via a toothed rim that is provided at said third crank web, with said toothed rim intermeshing with a first toothed wheel provided at a first one of said compensating shafts, said first toothed wheel intermeshing with a second toothed wheel provided at a second one of said compensating shafts;

said second compensating mass means is connected in a torque connection to said crank shaft via a toothed rim that is provided at said eighth crank web, with said toothed rim intermeshing with a third toothed wheel provided at a third one of said compensating shafts, said third toothed wheel intermeshing with a fourth toothed wheel provided at a fourth one of said compensating shafts;

said first compensating mass means is arranged essentially in a plane below a first bearing means that is adjacent to said third crank web, and said second compensating mass means is arranged essentially below a second bearing means that is adjacent to said eighth crank web; and said first, second, third and fourth compensating shafts are laterally displaced in a same direction by an identical amount relative to a center line of said crank shaft.

2. A device for compensating secondary moments of inertia according to claim 1, wherein said angle is 9° and corresponds to a position of said first crank throw before a top dead center position thereof in a initial stage.

3. A device for compensating secondary moments of inertia according to claim 1, wherein said bearing housings for bearing said compensating shafts are respectively disposed in a plane below said bearing means and are attached to sides of said crank case by screw means, with each one of said compensating masses of said respective first and second compensating mass means comprising a first and a second half respectively, so that a respective center of gravity of each one of said compensating masses is positioned such that a respective force couple of inertia forces of said first compensating mass means and said second compensating means eliminates said secondary moments of inertia, whereby said first half of each one of said compensating masses is an integral part of said respective compensating shaft and said second half of each one of said compensating masses is an integral part of said respective toothed wheel and is fixedly connected to said respective compensating shaft.

* * * * *

UNITED STATES PATENT AND TRADEMARK OFFICE
CERTIFICATE OF CORRECTION

PATENT NO. : 5,083,535
DATED : Jan. 28, 1992
INVENTOR(S) : Deschler et al

It is certified that error appears in the above-identified patent and that said Letters Patent is hereby corrected as shown below:

On the title page, item [54] and in column 1, lines 1-4, the title should read as follows:

-- DEVICE FOR COMPENSATING SECONDARY MOMENTS OF INERTIA IN FIVE-CYLINDER IN-LINE COMBUSTION ENGINES--.

Signed and Sealed this

Twenty-third Day of February, 1993

Attest:

STEPHEN G. KUNIN

*Attesting Officer*     Acting Commissioner of Patents and Trademarks